(12) United States Patent
Heinrichs

(10) Patent No.: US 10,567,592 B1
(45) Date of Patent: Feb. 18, 2020

(54) SYSTEM AND METHOD FOR HANDLING SPECIAL NUMBER CALLS CONVEYED TO A PREDETERMINED DESTINATION

(71) Applicant: West Corporation, Omaha, NE (US)

(72) Inventor: George Heinrichs, Longmont, CO (US)

(73) Assignee: West Corporation, Omaha, NE (US)

( * ) Notice: Subject to any disclaimer, the term of this patent is extended or adjusted under 35 U.S.C. 154(b) by 130 days.

(21) Appl. No.: 15/212,763

(22) Filed: Jul. 18, 2016

Related U.S. Application Data

(63) Continuation of application No. 13/534,029, filed on Jun. 27, 2012, now Pat. No. 9,398,151.

(51) Int. Cl.
| | |
|---|---|
| *H04M 7/00* | (2006.01) |
| *H04M 3/42* | (2006.01) |
| *H04M 3/51* | (2006.01) |
| *H04M 3/54* | (2006.01) |
| *H04M 3/46* | (2006.01) |
| *H04M 3/56* | (2006.01) |
| *H04M 3/22* | (2006.01) |

(52) U.S. Cl.
CPC ....... *H04M 7/0033* (2013.01); *H04M 3/2281* (2013.01); *H04M 3/42059* (2013.01); *H04M 3/42221* (2013.01); *H04M 3/465* (2013.01); *H04M 3/5116* (2013.01); *H04M 3/543* (2013.01); *H04M 3/56* (2013.01); *H04M 2203/558* (2013.01); *H04M 2242/04* (2013.01)

(58) Field of Classification Search
CPC .. H04M 3/5116; H04M 3/5141; H04M 3/541; H04M 1/72536; H04M 2242/04; H04W 4/22
See application file for complete search history.

(56) References Cited

U.S. PATENT DOCUMENTS

| | | | | |
|---|---|---|---|---|
| 2008/0192731 | A1* | 8/2008 | Dickinson | H04L 12/66 370/352 |
| 2009/0010398 | A1* | 1/2009 | Nelson | H04M 3/5116 379/45 |
| 2010/0166154 | A1* | 7/2010 | Peters | H04M 3/5116 379/45 |

* cited by examiner

*Primary Examiner* — Anh Ngoc M Nguyen

(57) ABSTRACT

A system for handling incoming special number calls conveyed via a telecommunication system to a predetermined destination includes: (a) a data store for storing information regarding a plurality of pre-identified special number call originating devices; (b) a detecting unit coupled with the data store and with the telecommunication system; the detecting unit detecting a received communication incoming to the predetermined destination from one pre-identified special number call originating device of the plurality of pre-identified special number call originating devices; and (c) a treating unit coupled with the detecting unit and with the telecommunication system; the treating unit effecting a predetermined treatment of the received communication.

14 Claims, 4 Drawing Sheets

SYSTEM AND METHOD FOR HANDLING SPECIAL NUMBER CALLS CONVEYED TO A PREDETERMINED DESTINATION

CROSS-REFERENCE TO RELATED APPLICATIONS

This application is a continuation from U.S. patent application Ser. No. 13/534,029, filed Jun. 27, 2012, entitled "SYSTEM AND METHOD FOR HANDLING SPECIAL NUMBER CALLS CONVEYED TO A PREDETERMINED DESTINATION", the entire contents of which is incorporated by reference herein in its entirety.

FIELD OF THE INVENTION

The present invention is directed to telecommunication systems, and especially to handling special number calls pre-identified for special treatment and conveyed to a pre-determined destination.

BACKGROUND OF THE INVENTION

There may be occasions when an originating caller device maybe flagged or otherwise identified in order to provide special treatment for calls received from that pre-identified device when such calls are conveyed to a predetermined destination. Such a capability in a telecommunication system may save someone's life or result in the capture of serious criminals. By way of example and not by way of limitation, having such a capability in a telecommunication system to identify calls originating from predetermined call originating devices in connection with an emergency service network, sometimes referred to as a 9-1-1 system or network, may permit thwarting of terrorists who may attempt to use the 9-1-1 system to divert resources as part of a terrorist plot.

Such a desirable capability may be embodied in a subsystem for a 9-1-1 network that will permit special flagging, third party notification and intercept of inbound calls. An exemplary application may be illustrated when a person is kidnapped and their personal phone is missing. The telephone number or another identifying piece of information relating to the missing personal phone may be loaded into and stored with the sub-system so that all calls from that missing personal phone may be identified when the phone is used to call a predetermined destination, such as an emergency service call taking station. In this example, flagging could be carried out on a local, regional or nationwide basis. While a kidnapping may not be well known outside of a state, such a widespread notification could advantageously alert officials of the occurrence. As used herein, the term "exemplary" indicates an example and not necessarily an ideal.

An example of such an emergency service call taking station may be a Public Safety Answering Position (PSAP; sometimes referred to as a Public Safety Answering Point).

Examples of special treatment may include, but are not limited to, rerouting said received call (embodied in a received communication or communication signal) to an alternate destination than the predetermined destination, rerouting the received communication signal to an alternate destination in addition to the predetermined destination, notifying a third party of receipt of the received communication signal, interception of the received communication signal before completion of delivery to the predetermined destination, audio capture of audio content of the received communication signal, multi-media capture of multi-media content of the received communication signal, text capture of text content of the received communication signal, e-mail capture of e-mail content of the received communication signal, automatic establishing of a conference call for the received communication signal with at least one third party, and exception handling of the received communication signal to effect other than normal handling of the received communication signal, special routing, third party notification, audio capture of audio content of the received call, automatic conferencing with designated third parties and appropriate exception handling and other non-routine treatments for communications of a type similar to the received communication.

There is a need for a system and method for handling special number calls conveyed to a predetermined destination.

There is a need for a system and method for handling special number calls conveyed to a predetermined emergency service answering position.

SUMMARY OF THE INVENTION

A system for handling incoming special number calls conveyed via a telecommunication system to a predetermined destination includes: (a) a data store for storing information regarding a plurality of pre-identified special number call originating devices; (b) a detecting unit coupled with the data store and with the telecommunication system; the detecting unit detecting a received communication incoming to the predetermined destination from one pre-identified special number call originating device of the plurality of pre-identified special number call originating devices; and (c) a treating unit coupled with the detecting unit and with the telecommunication system; the treating unit effecting a predetermined treatment of the received communication. Information regarding pre-identified special number call originating devices may advantageously be stored employing any one or more unique identifiers such as, by way of example and not by way of limitation, telephone number, internet protocol (IP) address, MAC (Media Access Control) address, radio identifier or another unique identifier.

A method for effecting special treatment for communications from pre-identified call originators includes: (a) storing information relating to a plurality of the pre-identified call originators in a data store; (b) detecting a received communication incoming to a predetermined destination from one pre-identified call originator of the plurality of pre-identified call originators; and (c) effecting a pre-determined treatment of the received communication.

It is, therefore a feature of the present invention to provide for a system and method for handling special number calls conveyed to a predetermined destination.

It is another feature of the present invention to provide a system and method for handling special number calls conveyed to a predetermined emergency service answering position.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems (e.g., "N-1-1 networks"), such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
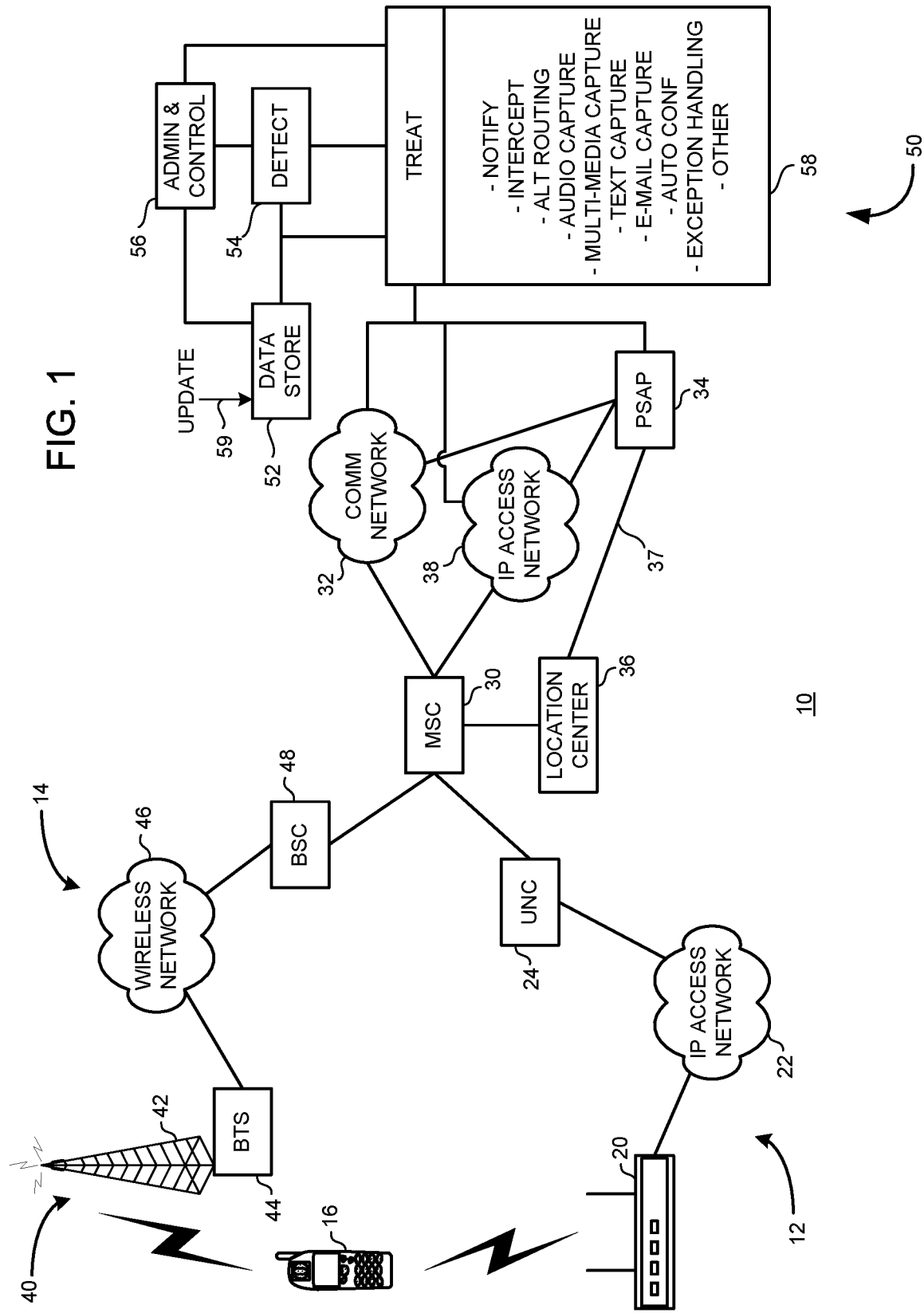
FIG. 1 is a schematic illustration of a system for effecting the present invention.

FIG. 1 is a schematic diagram illustrating a system for handling special number calls using a text message format. In FIG. 1, a telecommunication system 10 includes an Unlicensed Mobile Access (UMA) Network (UMAN) 12 and a Radio Access Network (RAN) 14. UMAN 12 may be embodied in, by way of example and not by way of limitation, a Wi-Fi network, a Bluetooth network or another type of UMA. RAN 14 may be embodied in, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 12 and RAN 14 are configured for wireless communication with a wireless calling unit or instrument 16. Wireless calling unit 16 may be embodied in a wireless calling device including, by way of example and not by way of limitation, mobile telephone, Personal Digital Assistant (PDA) devices, "Smart" phones, automatic crash notification (ACN) units, mobile radio devices and similar communication devices.

UMAN 12 includes an access unit 20 coupled with an Internet Protocol (IP) access network 22. Access unit 20 facilitates communication between wireless communicating unit 16 and IP network 22. IP network 22 is coupled with a UMA Network Controller (UNC) 24. UNC 24 is coupled with a Mobile Switching Center (MSC) 30. MSC 30 is coupled with a communication network 32. Communication network 32 is coupled with a PSAP 34. MSC 30 is also coupled with a location center 36.

PSAP 34 may be connected with MSC 30 via an IP network 38 to permit communication between PSAP 34 and MSC 30 without involving communication network 32. PSAP 34 may be directly coupled with location center 36 via a direct connection 37 to permit communication between PSAP 34 and location center 36 without traversing an intervening network.

RAN 14 includes an access unit 40 that includes a radio antenna embodied in a radio tower 42 and a Base Transceiver Station (BTS) 44 coupled with radio tower 42. BTS 44 is coupled with a private network 46. Private network 46 may be embodied in, by way of example and not by way of limitation, a cellular network or a PCS network employing any of several communication protocols including, by way of further example and not by way of limitation, Advanced Mobile Phone Service (AMPS), GSM or another protocol using Time Division Multiple Access (TDMA), Code Division Multiple Access (CDMA) or another coding scheme. Access unit 40 facilitates communication between wireless communicating unit 16 and private network 46. Private network 46 is coupled with a Base Station Controller (BSC) 48. BSC 48 is coupled with MSC 30.

Calling unit 16 may wirelessly access UMAN 12 to place an emergency 9-1-1 call via access unit 20 to establish communication with PSAP 34 via IP network 22, UNC 24, MSC 30 and one or both of communication network 32 and IP network 38.

Calling unit 16 may instead wirelessly access RAN 14 to place an emergency 9-1-1 call via BTS 44 to establish communication with PSAP 34 via private network 46, BSC 48 and MSC 130.

An exception treating section 50 is coupled with communication network 32, IP network 38 and PSAP 34. Exception treating section 50 includes a data store 52 coupled with a detecting unit 54, coupled with an administration/control unit 56 and coupled with a treating unit 58. Treating unit 58 is coupled with communication network 32, IP network 38 and PSAP 34. Administration/control unit 56 may also be coupled with detecting unit 54 and with treating unit 58.

Data store 52 is configured to store information regarding pre-identified call originating devices, such as by way of example and not by way of limitation telephone numbers, Electronic Serial Numbers (ESNs) or other information. Data store 52 may be updated to add, change or delete information. Information may be provided to data store 52 and may be updated as needed as a subscription service. Updating may be effected by a calling service provider, by a subscription service provider not associated with a calling service provider or may be provided by PSAP 34 (or another special number call answering position).

Updating information stored in data store 52 may be carried out locally by a service connected directly with calling instrument 16 or may be carried out remotely via a communicate link such as, by way of example and not by way of limitation, UMAN 12 or RAN 14. Updating may be effected using one or more various connection configurations such as, by way of example and not by way of limitation, a wireless connection, a cable connection and an infrared connection. An update port 59 may be provided to facilitate updating data store 52. Updating data store 52 is discussed further in connection with FIG. 3.

Detecting unit 54 is configured for detecting a received communication or received communication signal incoming to a predetermined destination such as, by way of example and not by way of limitation, PSAP 34 from one of the pre-identified call originating devices regarding which information is stored in data store 52. An example of such a pre-identified call originating device may be calling unit 16.

Treating unit 58 is configured for cooperating with detecting unit 54 and administration/control unit 56 to effect a predetermined treatment of the received communication or received communication signal detected by detecting unit 54. Treatment of a detected received communication may include, by way of example and not by way of limitation, at least one of rerouting the received communication to an alternate destination than the predetermined destination, rerouting the received communication to an alternate destination in addition to the predetermined destination, notifying a third party of receipt of the received communication, interception of the received communication before completion of delivery to the predetermined destination, audio capture of audio content of the received communication, multi-media capture of multi-media content of the received communication, text capture of text content of the received communication, e-mail capture of e-mail content of the received communication, automatic establishing of a conference call for the received communication with at least one third party, and other exception handling of the received communication to effect other than normal handling of the received communication.

Administration/control unit 56 is configured to control administrative and operations aspects of exception treating section 50. By way of example and not by way of limitation, administration/control unit 56 may be configured to include storing or controlling access to administrative contact information, court order references information if required, primary and secondary routing instructions, email addresses and permissions, phone numbers and other information for third party notifications, flags to control implementation of visible or silent operation, optional special text displays for 9-1-1 operators or other operators at PSAP 34 or elsewhere and similar administration or control details.

Exception treating section 50 may be embodied in a sub-system that is integrated into an emergency service network (e.g., 9-1-1 network) selective routing and Automatic Location Identification (ALI; sometimes referred to as Automatic Location Information) database query engines. Numbers that are detected by detecting unit 54 as being pre-identified call originating device numbers may retain their normal routing in the standard systems but may have an override routing and special handling rule which would be implemented at the moment detection of the call.

Records stored in data store 52 or in administration/control unit 56 may be made accessible or visible to 9-1-1 system operators or could be flagged to be "silent" so that an investigator will be notified of the call but others will not be notified. Such a "silent" arrangement may be useful if an investigation is of national security concern or otherwise classified as Secret or protected.

Treating unit 58 may include system compatible instructions (e.g., valid route destinations in the traditional 9-1-1 infrastructure) for over-ride routing of a detected call. Such an arrangement may allow a local 9-1-1 network to support call events that originate outside the local 9-1-1 network but which are routed to the local 9-1-1 network by other non-routine arrangements (e.g., roamers from other 9-1-1 networks traveling within the local 9-1-1 network).

Exception treating section 50 would preferably flag routing, ALI display and third party notification. Exception treating section 50 would preferably maintain separate and detailed log files. Exception treating section 50 would also preferably capture full audio and other content (e.g., multimedia, text and email content) and would automatically provide information to an official requesting party if legally permissible. Administration/control unit 56 may oversee and control such functions and responses.

Administration/control unit 56 would preferably concentrate all control and administrative elements of exception treating section 50. This oversight and control would preferably include administrative contact information; court order reference information if required; and primary and secondary routing instructions, email instructions and addresses, phone numbers and other information required to carrying out third party notifications. This oversight and control would also preferably include flags which control visible or silent operation and optional special text displays for 9-1-1 operators.

Administration/control unit 56 and data store 52 may cooperate to automatically "age" the exception rules entered and may have provisions for expiration of those exception rules. Exception treating section 50 may also have a module which monitors service order records to flag activity or deactivation of phones. This module is not explicitly shown in the drawings but may be understood by those skilled in the art of telecommunication systems design as being readily includible in administration/control unit 56 or elsewhere in exception treating section 50.

A commercial special call answering position, such as a phone-in florist ordering desk, may employ a version of the present invention to aid in identifying particular customers such as often-visiting customers or "deadbeat" customers for special treatment of an appropriate sort. For example, good, often-visiting customers may be routed to a special concierge service desk for special treatment. In contrast, "deadbeat" customers may be routed to a collections desk. Other commercial applications may employ the present invention to significant advantage to aid in marketing goods and services via phone.

Figure 2:
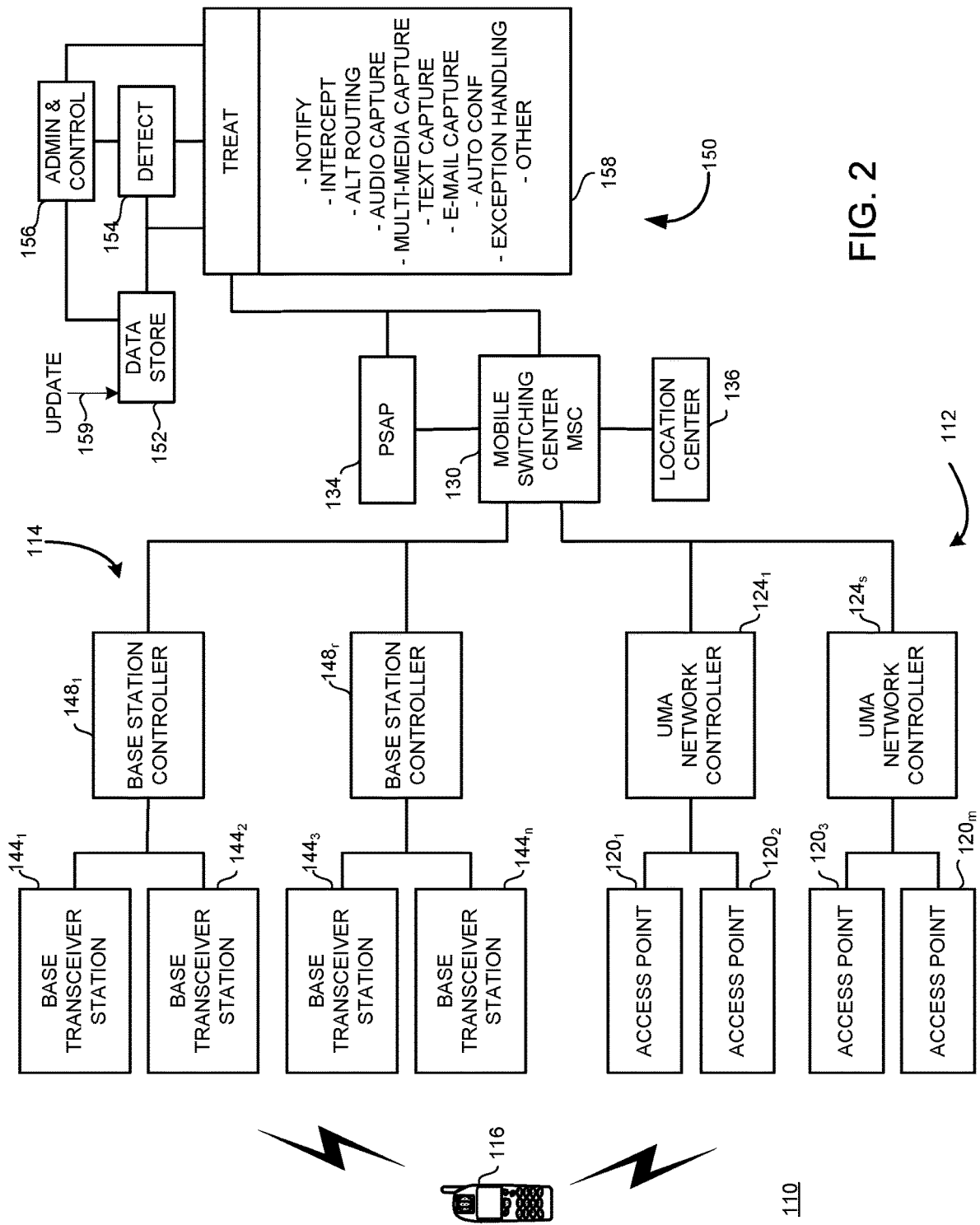
FIG. 2 is a schematic diagram illustrating call routing for a system configured according to the teaching of the present invention deployed in a representative multi-network arrangement.

FIG. 2 is a schematic diagram illustrating call routing for a system configured according to the teaching of the present invention deployed in a representative multi-network arrangement. In FIG. 2, a telecommunication system 110 includes an Unlicensed Mobile Access (UMA) Network (UMAN) 112 and a Radio Access Network (RAN) 114. UMAN 112 may include, by way of example and not by way of limitation, a Wi-Fi network, a Bluetooth network or another type of UMA. RAN 114 may include, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 112 and RAN 114 are configured for wireless communication with a wireless calling unit or instrument 116.

UMAN 112 includes access units $120_1$, $120_2$, $120_3$, $120_m$ coupled for call routing via an Internet Protocol (IP) network (not shown in FIG. 2; see IP network 22, FIG. 1). The indicator "m" is employed to signify that there can be any number of access units in telecommunication system 110. The inclusion of four access units $120_1$, $120_2$, $120_3$, $120_m$ in FIG. 2 is illustrative only and does not constitute any limitation regarding the number of access units that may be included in a telecommunication system employing the present invention. Throughout this description, use of a reference numeral using a generic subscript herein may be taken to mean that any respective member of the plurality of elements having the same reference numeral may be regarded as included in the description. Thus, by way of example and not by way of limitation, referring to access units $120_m$ in describing FIG. 2 may be taken to mean that any access unit—$120_1$, $120_2$, $120_3$ or $120_m$ (FIG. 2)—may be regarded as capable of employment as described.

Access units $120_1$, $120_2$, $120_3$, $120_m$ facilitate communication with a wireless communicating unit 116. Calls from access units $120_1$, $120_2$ may be placed with a UMA Network Controller (UNC) $124_1$. Calls from access units $120_3$, $120_m$ may be placed with a UMA Network Controller (UNC) $124_s$. The indicator "s" is employed to signify that there can be any number of UNCs in telecommunication system 110. The inclusion of two UNCs $124_1$, $124_s$ in FIG. 2 is illustrative only and does not constitute any limitation regarding the number of UNCs that may be included in a telecommunication system employing the present invention. UNCs $124_1$, $124_s$ are coupled with a Mobile Switching Center (MSC) 130. MSC 130 is coupled for call routing with a receiving or called party such as, by way of example and not by way of limitation, PSAP 134 via a communication network (not shown in FIG. 2; see communication network 30, FIG. 1). MSC 130 is also coupled with a location center 136.

RAN 114 includes access units represented in FIG. 2 by Base Transceiver Stations (BTS) $144_1$, $144_2$, $144_3$, $144_n$. The indicator "n" is employed to signify that there can be any number of BTSs in telecommunication system 110. The inclusion of four BTSs $144_1$, $144_2$, $144_3$, $144_n$ in FIG. 2 is illustrative only and does not constitute any limitation regarding the number of BTSs that may be included in a telecommunication system employing the present invention.

BTSs $144_1$, $144_2$, $144_3$, $144_n$ are coupled for call routing with MCS 130 via a private network (not shown in FIG. 2; see private network 46, FIG. 1). BTSs $144_1$, $144_2$, $144_3$, $144_n$ facilitate communication with wireless communicating unit 116. BTSs $144_1$, $144_2$, $144_3$, $144_n$ are coupled with a Base Station Controllers (BSC) $148_1$, $148_r$. Calls from BTSs $144_1$, $144_2$ may be placed with BSC $148_1$. Calls from BTSs $144_3$, $144_n$ may be placed with a BSC $148_r$. The indicator "r" is employed to signify that there can be any number of BSCs in telecommunication system 110. The inclusion of two BSCs $148_1$, $148_r$ in FIG. 2 is illustrative only and does not constitute any limitation regarding the number of BSCs that may be included in a telecommunication system employing the present invention. BSCs $148_1$, $148_r$ are coupled with MSC 130.

Calling unit 116 may wirelessly access UMAN 112 to place an emergency 9-1-1 call via an access unit $120_1$, $120_2$, $120_3$, $120_m$ to establish communication with PSAP 134 via a UNC $124_1$, $124_s$ and MSC 130.

Calling unit 116 may instead wirelessly access RAN 114 to place an emergency 9-1-1 call via a BTS $144_1$, $144_2$, $144_3$, $144_n$ to establish communication with PSAP 134 via a BSC $148_1$, $148_r$ and MSC 130.

An exception treating section 150 is coupled with MSC 130 and PSAP 134. Exception treating section 150 includes a data store 152 coupled with a detecting unit 154, coupled with an administration/control unit 156 and coupled with a treating unit 158. Treating unit 158 is coupled with MSC 130 and PSAP 134. Administration/control unit 156 may also be coupled with detecting unit 154 and with treating unit 158.

Data store 152 is configured to store information regarding pre-identified call originating devices, such as by way of example and not by way of limitation telephone numbers, Electronic Serial Numbers (ESNs) or other information. Data store 152 may be updated to add, change or delete information. Information may be provided to data store 152 and may be updated as needed as a subscription service. Updating may be effected by a calling service provider, by a subscription service provider not associated with a calling service provider or may be provided by PSAP 134 (or another special number call answering position).

Updating information stored in data store 152 may be carried out locally by a service connected directly with calling instrument 116 or may be carried out remotely via a communicate link such as, by way of example and not by way of limitation, UMAN 112 or RAN 114. Updating may be effected using one or more various connection configurations such as, by way of example and not by way of limitation, a wireless connection, a cable connection and an infrared connection. An update port 159 may be provided to facilitate updating data store 152. Updating data store 152 is discussed further in connection with FIG. 3.

Detecting unit 154 is configured for detecting a received communication or received communication signal incoming to a predetermined destination such as, by way of example and not by way of limitation, PSAP 134 from one of the pre-identified call originating devices regarding which information is stored in data store 152. An example of such a pre-identified call originating device may be calling unit 116.

Treating unit 158 is configured for cooperating with detecting unit 154 and administration/control unit 156 to effect a predetermined treatment of the received communication or received communication signal detected by detecting unit 154. Treatment of a detected received communication may include, by way of example and not by way of limitation, at least one of rerouting the received communication to an alternate destination than the predetermined destination, rerouting the received communication to an alternate destination in addition to the predetermined destination, notifying a third party of receipt of the received communication, interception of the received communication before completion of delivery to the predetermined destination, audio capture of audio content of the received communication, multi-media capture of multi-media content of the received communication, text capture of text content of the received communication, e-mail capture of e-mail content of the received communication, automatic establishing of a conference call for the received communication with at least one third party, and other exception handling of the received communication to effect other than normal handling of the received communication.

Administration/control unit 156 is configured to control administrative and operations aspects of exception treating section 150. By way of example and not by way of limitation, administration/control unit 156 may be configured to include storing or controlling access to administrative contact information, court order references information if required, primary and secondary routing instructions, email addresses and permissions, phone numbers and other information for third party notifications, flags to control implementation of visible or silent operation, optional special text displays for 9-1-1 operators or other operators at PSAP 134 or elsewhere and similar administration or control details.

Exception treating section 150 may be embodied in a sub-system that is integrated into an emergency service network (e.g., 9-1-1 network) selective routing and Automatic Location Identification (ALI; sometimes referred to as Automatic Location Information) database query engines. Numbers that are detected by detecting unit 154 as being pre-identified call originating device numbers may retain their normal routing in the standard systems but may have an override routing and special handling rule which would be implemented at the moment detection of the call.

Records stored in data store 152 or in administration/control unit 156 may be made accessible or visible to 9-1-1 system operators or could be flagged to be "silent" so that an investigator will be notified of the call but others will not be notified. Such a "silent" arrangement may be useful if an investigation is of national security concern or otherwise classified as Secret or protected.

Treating unit 158 may include system compatible instructions (e.g., valid route destinations in the traditional 9-1-1 infrastructure) for over-ride routing of a detected call. Such an arrangement may allow a local 9-1-1 network to support call events that originate outside the local 9-1-1 network but which are routed to the local 9-1-1 network by other non-routine arrangements (e.g., roamers from other 9-1-1 networks traveling within the local 9-1-1 network).

Exception treating section 150 would preferably flag routing, ALI display and third party notification. Exception treating section 150 would preferably maintain separate and detailed log files. Exception treating section 150 would also preferably capture full audio and other content (e.g., multimedia, text and email content) and would automatically provide information to an official requesting party if legally permissible. Administration/control unit 56 may oversee and control such functions and responses.

Administration/control unit 156 would preferably concentrate all control and administrative elements of exception treating section 150. This oversight and control would preferably include administrative contact information; court order reference information if required; and primary and secondary routing instructions, email instructions and addresses, phone numbers and other information required to carrying out third party notifications. This oversight and control would also preferably include flags which control visible or silent operation and optional special text displays for 9-1-1 operators.

Administration/control unit 156 and data store 152 may cooperate to automatically "age" the exception rules entered and may have provisions for expiration of those exception rules. Exception treating section 150 may also have a module which monitors service order records to flag activity or deactivation of phones. This module is not explicitly shown in the drawings but may be understood by those skilled in the art of telecommunication systems design as being readily includible in administration/control unit 156 or elsewhere in exception treating section 150.

A commercial special call answering position, such as a phone-in florist ordering desk, may employ a version of the present invention to aid in identifying particular customers such as often-visiting customers or "deadbeat" customers for special treatment of an appropriate sort. For example, good, often-visiting customers may be routed to a special concierge service desk for special treatment. In contrast, "deadbeat" customers may be routed to a collections desk. Other commercial applications may employ the present invention to significant advantage to aid in marketing goods and services via phone.

Figure 3:
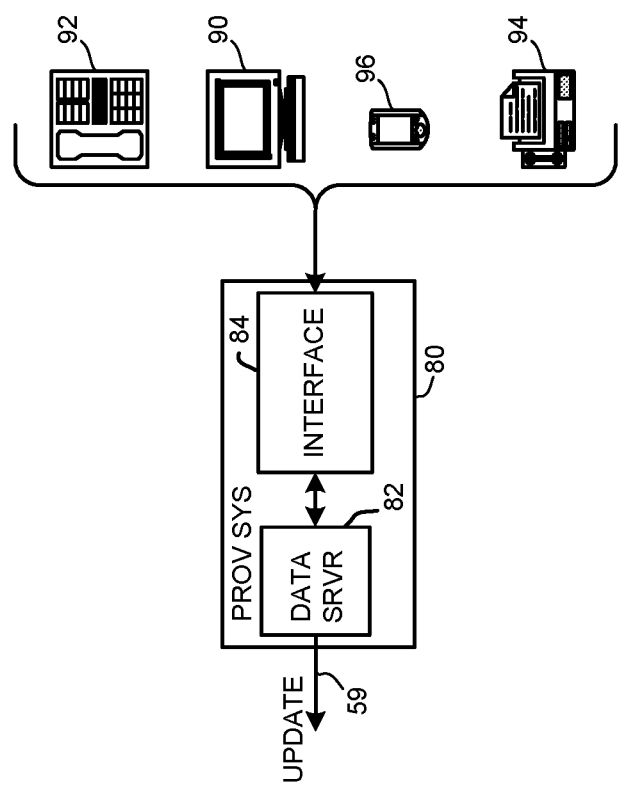
FIG. 3 is a schematic diagram illustrating various ways that the storage unit illustrated in FIG. 1 may be updated.

FIG. 3 is a schematic diagram illustrating various ways that the storage unit illustrated in FIG. 1 may be updated. In FIG. 3, a provisioning system 80 is configured for updating information in data store 52 (FIG. 1). Provisioning system 80 includes a data server unit 82 coupled with an interface unit 84.

Provisioning system 80 is coupled with a communications or update port 59 associated with data store 52 (FIG. 1). Data store 52 may be updated based on preferences set up by a home or business subscriber and submitted to provisioning system 80 via interface unit 84 by any of various technologies known to those skilled in the art of telecommunication system design including, by way of example and not by way of limitation, a computer 90, a phone 92, a facsimile machine 94 and a PDA (Personal Digital Assistant) 96 or another communication device such as, by way of example and not by way of limitation, a smart phone (not shown in FIG. 3).

Updating via update port 59 may be effected using one or more various connection configurations such as, by way of example and not by way of limitation, a wireless connection, a cable connection and an infrared connection.

Figure 4:
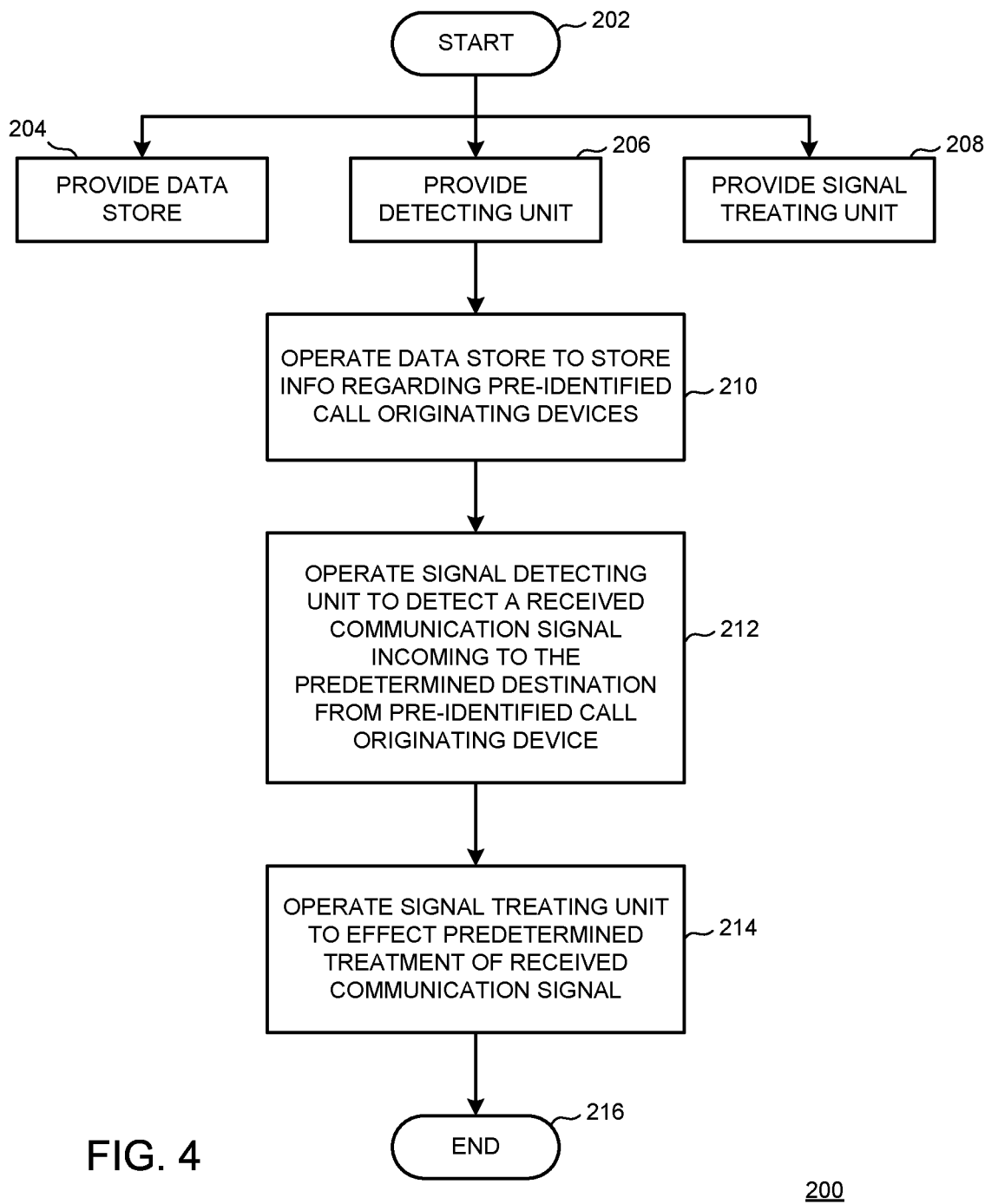
FIG. 4 is a flow diagram illustrating the method of the present invention.

FIG. 4 is a flow diagram illustrating the method of the present invention. In FIG. 4, a method 200 for handling incoming special number calls conveyed via a telecommunication system to a predetermined destination begins at a START locus 202.

Method 200 continues with, in no particular order: (1) providing a data store, as indicated by a block 204; (2) providing a signal detecting unit coupled with the data store and with the telecommunication system, as indicated by a block 206; and (3) providing a signal treating unit coupled with the signal detecting unit and with the telecommunication system, as indicated by a block 208.

Method 200 continues with operating the data store to store information regarding a plurality of pre-identified special number call originating devices, as indicated by a block 210.

Method 200 continues with operating the signal detecting unit to detect a received communication signal incoming to the predetermined destination from one pre-identified special number call originating device of the plurality of pre-identified special number call originating devices, as indicated by a block 212.

Method 200 continues with operating the signal treating unit to effect a predetermined treatment of the received communication signal, as indicated by a block 214. Method 200 terminates at an END locus 216.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims.

The invention claimed is:

1. A system for handling incoming special number calls conveyed via a telecommunication system, the system comprising:

(a) a data store for storing information regarding a plurality of pre-identified special number call originating devices, wherein a particular pre-identification designates that a call made from a particular pre-identified special number call originating device, of the plurality of pre-identified special number call originating devices, is routed to a predetermined destination specifically associated with the particular pre-identified special number call originating device, and wherein a portion of the information stored in the data store is associated with a flag indicating that the portion of the information will only be available to said predetermined destination;

(b) a detecting unit coupled with said data store and with said telecommunication system, said detecting unit detecting a received communication incoming to said predetermined destination from one pre-identified special number call originating device of said plurality of pre-identified special number call originating devices; and (c) a treating unit coupled with said detecting unit and with said telecommunication system, said treating unit effecting a predetermined treatment of said received communication, wherein said predetermined treatment includes rerouting said received communication to said predetermined destination, wherein the rerouting is performed without making information in the received communication available to an emergency system operator associated with telecommunication system based on the flag.

2. The system for handling incoming special number calls conveyed via a telecommunication system to the predetermined destination as recited in claim 1, wherein said predetermined destination is a public safety answering position in an emergency service network.

3. The system for handling incoming special number calls conveyed via a telecommunication system to the predetermined destination as recited in claim 1, wherein said detecting is effected as said received communication arrives at said predetermined destination, and wherein said predetermined treatment is effected as said detecting is effected.

4. The system for handling incoming special number calls conveyed via a telecommunication system to predetermined destination as recited in claim 1, wherein said predetermined treatment includes at least one of:

interception of said received communication before completion of delivery to said predetermined destination, audio capture of audio content of said received communication, multi-media capture of multi-media content of said received communication, text capture of text content of said received communication, e-mail capture of e-mail content of said received communication, automatic establishing of a conference call for said received communication with at least one third party, and exception handling of said received communication to effect other than normal handling of said received communication.

5. The system for handling incoming special number calls conveyed via a telecommunication system to the predetermined destination as recited in claim 3, wherein said predetermined treatment includes at least one of:

interception of said received communication before completion of delivery to said predetermined destination, audio capture of audio content of said received communication, multi-media capture of multi-media content of said received communication, text capture of text content of said received communication, e-mail capture of e-mail content of said received communication, automatic establishing of a conference call for said received communication with at least one third party, and exception handling of said received communication to effect other than normal handling of said received communication.

6. A method for handling incoming special number calls conveyed via a telecommunication system, the method comprising:

(a) in no particular order:
(1) providing a data store,
(2) providing a signal detecting unit coupled with said data store and with said telecommunication system, and
(3) providing a signal treating unit coupled with said signal detecting unit and with said telecommunication system;

(b) operating said data store to store information regarding a plurality of pre-identified special number call originating devices, wherein a particular pre-identification designates that a call made from a particular pre-identified special number call originating device, of the plurality of pre-identified special number call originating devices, is routed to a predetermined destination specifically associated with the particular pre-identified special number call originating device, and wherein a portion of the information stored in the data store is associated with a flag indicating that the portion of the information will only be available to said predetermined destination or to an alternate destination other than said predetermined destination;

(c) operating said signal detecting unit to detect a received communication signal incoming to said predetermined destination from one pre-identified special number call originating device of said plurality of pre-identified special number call originating devices; and (d) operating said signal treating unit to effect a predetermined treatment of said received communication signal, wherein said predetermined treatment includes rerouting said received communication signal to said predetermined destination, wherein the rerouting is performed without making information in the received communication signal available to an emergency system operator associated with telecommunication system based on the flag.

7. The method for handling incoming special number calls conveyed via a telecommunication system to the predetermined destination as recited in claim 6, wherein said predetermined destination is a public safety answering position in an emergency service network.

8. The method for handling incoming special number calls conveyed via a telecommunication system to the predetermined destination as recited in claim 6, wherein said detecting is effected as said received communication signal arrives at said predetermined destination, and wherein said predetermined treatment is effected as said detecting is effected.

9. The method for handling incoming special number calls conveyed via a telecommunication system to the predetermined destination as recited in claim 6, wherein said predetermined treatment includes at least one of:

interception of said received communication before completion of delivery to said predetermined destination, audio capture of audio content of said received communication, multi-media capture of multi-media content of said received communication, text capture of text content of said received communication, e-mail capture of e-mail content of said received communication, automatic establishing of a conference call for said received communication with at least one third party, and exception handling of said received communication to effect other than normal handling of said received communication.

10. The method for handling incoming special number calls conveyed via a telecommunication system to the predetermined destination as recited in claim 8, wherein said predetermined treatment includes at least one of:
   interception of said received communication before completion of delivery to said predetermined destination,
   audio capture of audio content of said received communication,
   multi-media capture of multi-media content of said received communication, text capture of text content of said received communication,
   e-mail capture of e-mail content of said received communication, automatic establishing of a conference call for said received communication with at least one third party, and
   exception handling of said received communication to effect other than normal handling of said received communication.

11. A method for effecting special treatment for communications from pre-identified call originators, the method comprising:
   (a) storing information relating to a plurality of said pre-identified call originators in a data store, wherein a particular pre-identification designates that a call made from a particular pre-identified originator, of the pre-identified call originators, is routed to a predetermined destination specifically associated with the particular pre-identified call originator, and wherein a portion of the information stored in the data store is associated with a flag indicating that the portion of the information will only be available to said predetermined destination or to an alternate destination other than said predetermined destination;
   (b) detecting a received communication incoming to a public safety answering position from one pre-identified call originator of said plurality of pre-identified call originators; and
   (c) effecting a pre-determined treatment of said received communication, wherein said predetermined treatment includes rerouting said received communication to said predetermined destination,
      wherein the rerouting is performed without making information in the received communication available to an emergency system operator associated with telecommunication system based on the flag.

12. The method for effecting special treatment for communications from pre-identified call originators, as recited in claim 11, wherein said detecting is effected as said received communication arrives at said predetermined destination, and wherein said predetermined treatment is effected as said detecting is effected.

13. The method for effecting special treatment for communications from pre-identified call originators, as recited in claim 11, wherein said predetermined treatment includes at least one of:
   interception of said received communication before completion of delivery to said predetermined destination,
   audio capture of audio content of said received communication,
   multi-media capture of multi-media content of said received communication, text capture of text content of said received communication,
   e-mail capture of e-mail content of said received communication, automatic establishing of a conference call for said received communication with at least one third party, and
   exception handling of said received communication to effect other than normal handling of said received communication.

14. The method for effecting special treatment for communications from pre-identified call originators, as recited in claim 12, wherein said predetermined treatment includes at least one of:
   interception of said received communication before completion of delivery to said predetermined destination,
   audio capture of audio content of said received communication,
   multi-media capture of multi-media content of said received communication, text capture of text content of said received communication,
   e-mail capture of e-mail content of said received communication, automatic establishing of a conference call for said received communication with at least one third party, and exception handling of said received communication to effect other than normal handling of said received communication.

* * * * *